United States Patent [19]

Jurca

[11] Patent Number: 4,725,515
[45] Date of Patent: Feb. 16, 1988

[54] BUTTON CELL CONSTRUCTION WITH INTERNALLY COMPRESSED GASKET

[75] Inventor: Romulus P. Jurca, Westlake, Ohio

[73] Assignee: Eveready Battery Company, St. Louis, Mo.

[21] Appl. No.: 46,791

[22] Filed: May 7, 1987

[51] Int. Cl.⁴ .............................................. H01M 2/04
[52] U.S. Cl. .................... 429/174; 429/185; 29/623.1
[58] Field of Search .................. 429/172, 174, 185; 29/623.1

[56] References Cited

U.S. PATENT DOCUMENTS

| | | | |
|---|---|---|---|
| 2,712,565 | 7/1955 | Williams, Jr. | 136/107 |
| 3,096,217 | 7/1963 | Clune | 136/107 |
| 3,185,595 | 5/1965 | Schenk, Jr. | 136/133 |
| 3,440,110 | 4/1969 | Arbter | 429/174 |
| 3,457,117 | 7/1969 | Angelovich | 136/133 |
| 3,708,343 | 1/1973 | Walsh | 136/133 |
| 4,048,405 | 9/1977 | Megahed | 429/219 |
| 4,122,241 | 10/1978 | Ciliberti, Jr. et al. | 429/133 |
| 4,263,380 | 4/1981 | Riedl | 429/177 |
| 4,374,909 | 2/1983 | Tucholski | 429/185 |

FOREIGN PATENT DOCUMENTS

| | | | |
|---|---|---|---|
| 94272 | 2/1984 | European Pat. Off. | |
| 2254888 | 8/1975 | France | 136/114 |
| 59-27448 | 2/1984 | Japan | |

Primary Examiner—Donald L. Walton
Attorney, Agent, or Firm—Virgil B. Hill

[57] ABSTRACT

An electrochemical cell having an open top container with a radial flange, and a peripheral U-shaped gasket which extends over the container flange with depending skirts to extend along both the inner and outer upper wall portions, cooperative with an inner cover compressing the inner gasket skirt radially outwardly against the container inner wall and an outer cover surrounding and compressing the gasket outer skirt radially inwardly against the container outer wall.

10 Claims, 10 Drawing Figures

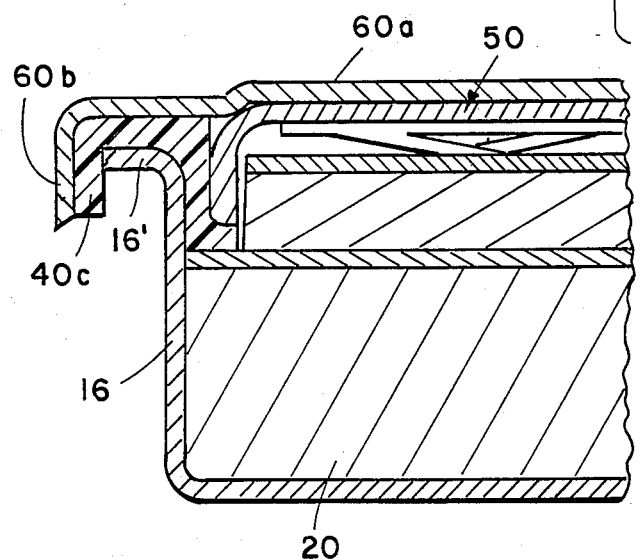

BUTTON CELL CONSTRUCTION WITH INTERNALLY COMPRESSED GASKET

BACKGROUND OF THE INVENTION

This invention relates to electrochemical button cells and particularly to improved leak resistant button cells and a method of assembling such cells.

Electrochemical cells of the button type are incorporated in many devices for producing electrical power. Button cells employing nonaqueous electrolytes and highly active metal anodes are particularly advantageous for certain uses while cells employing aqueous electrolytes are preferred for other uses. Some nonaqueous cells employ liquid cathodes such as sulfur dioxide or inorganic oxyhalides or thiohalides which contain dissolved metal salts, and these also serve as the electrolyte, with or without an added cosolvent. Other nonaqueous cells employ an organic solvent-based electrolyte. Aqueous cells may employ an aqueous alkaline electrolyte.

Although such cells perform remarkably well, there are certain limitations including a tendency of the electrolyte to leak after a period of time, and limited output under conditions of heavy drain service. Leakage occurs due to electrolyte creepage along the metal surface and along the gasket intended to effect a seal in such cell. Typical cell systems where leakage is a potential problem include not only the liquid cathode cells but also silver oxide-zinc cells, nickel-cadmium cells, and alkaline manganese dioxide cells.

Electrolyte leakage not only depletes the electrolyte solution from the cell but can also cause a corrosive deposit at the interface of the cover and container. This not only affects the cell appearance but can also damage the device in which the cell is used. If leakage occurs before the cell is sold, it becomes unmarketable.

Consequently, various cell structures have been proposed to limit leakage.

In some prior art button cell constructions, such as those of U.S. Pat. No. 3,185,595 and French patent No. 2,254,888, the seal gasket is constructed with a depending flange or skirt extending to the bottom of the cell container and serving to increase the electrolyte leakage path out of the cell. However, in examining the leakage performance of this type of cell construction, the inventor determined that, although the gasket is designed for a tight fit onto the container, during assembly of the cell which has the cover crimped onto the gasket, the lower portion of the gasket actually moves slightly radially inwardly away from the container wall, as the cell closing operations are performed. This weakens the seal at both the positive and negative internal interface areas, resulting in a shorter electrolyte path to the outside. Additionally, the closing operations tend to cause the corrosive electrolyte to be momentarily forced along the surfaces of the container and seal, initiating leakage paths. These factors lead to early leakage after a relatively short time period.

Referring to FIGS. 9 and 10 herein, a prior art cell is there depicted in completed assembly (FIG. 9), and enlarged (FIG. 10) to depict gasket shift away from the container wall. Various techniques in efforts to limit leakage include those in U.S. Pat. No. 4,374,909 which discloses a cell having a primary cover and a second cover, first and second gaskets, and an added outer cylindrical member over all the other elements; as well as published Japanese Application No. 59-27448 and U.S. Pat. No. 2,712,565 which set forth a cell with the container crimped around the edges of a double cover and inner gasket.

SUMMARY OF THE INVENTION

The novel button cell assembly herein employs a cup type container with a radially-outwardly projecting flange, and a gasket which extends over the container top edge with inner and outer skirts to cover the inner and outer upper wall sections of the container. This gasket is compressed radially outwardly inside the cell between the upright wall of an inner cover cup and the adjacent inner container wall, and is compressed radially inwardly between the inner wall of an outer cover cup and the outer container wall. This placement maintains uniform gasket compression, lengthening both positive and negative electrolyte leakage paths to forestall leakage. Improved gasket-to-container seal results from maintenance of constant gasket concentricity and snugness during cell closing operations, e.g. redrawing and crimping. The gasket is restrained from inward radial shift during the closing operation.

The sealing procedure results in an interim temporary seal by the inner cover at the inner gasket skirt so that the outer cover, which is subsequently installed, is clean rather than contaminated with electrolyte materials such as oxyhalide liquid or vapor as in the typical assembly operation. Such liquid or vapor initiates corrosion and leakage paths. The novel structure achieves a more uniform gasket compression obtained by having the gasket held in place by the interior cover entirely sealing around the container, and then being compressed with the exterior cover.

By use of a full cup for the inner cup-shaped cover in the novel assembly, the negative leakage path is increased equivalent to the height of the cup.

The novel cells which were so constructed have displayed significant leakage reduction under test. Morever, they exhibited a significant increase in heavy drain service.

BRIEF DESCRIPTION OF THE DRAWINGS

FIG. 5 is a sectional side elevational view showing one step of assembly of the novel cell, specifically with the inner cover being installed;

FIG. 6 is a sectional side elevational view of the cell in FIG. 5, showing a subsequent step of assembly, with the inner cover installed and the outer cover being positioned;

FIG. 7 is a fragmentary enlarged sectional side elevational view of the cup in FIGS. 5 and 6 with the outer cover installed but before closing operations;

FIG. 8 is an enlarged sectional fragmentary side elevational view of the cell in FIG. 7, after closing operations;

DESCRIPTION OF THE PREFERRED EMBODIMENTS

Figure 1:
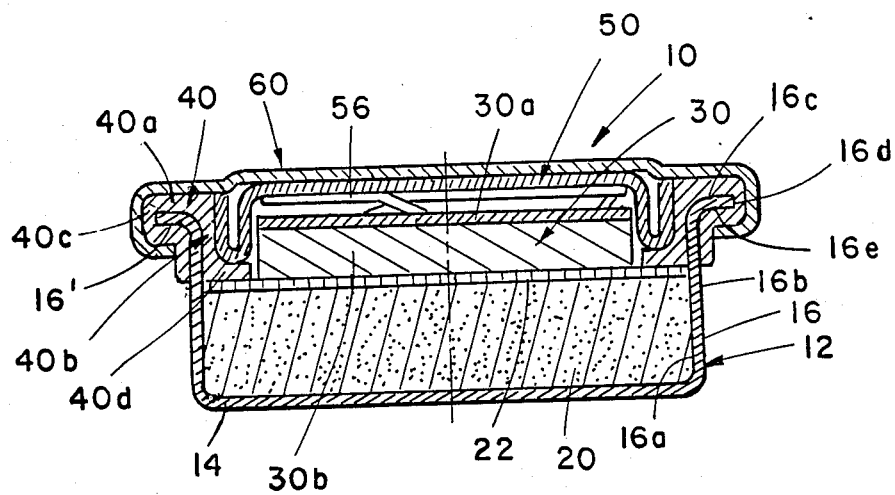
FIG. 1 is a sectional side elevational view of one embodiment of the novel cell.

The form of the novel electrochemical cell 10 depicted in FIG. 1 is shown to include a cup-shaped outer cathode container 12, a porous cathode collector 20, a separator 22, a laminated anode 30 consisting of the active anode layer 30b attached to the anode collector 30a, a peripheral gasket 40, a radial inner compressor member preferably in the form of an inner cover 50 which compresses the gasket radially outwardly, and an outer cover 60 which compresses the gasket radially inwardly. One type of cell for which this construction is particularly advantageous is a liquid cathode cell, e.g. using a liquid cathode-electrolyte based on $SOCl_2$ along with a lithium anode.

The cup-shaped container 12 is cylindrical, normally a cylinder of circular cross section but alternatively of other cylindrical configurations including polygonal. It includes a bottom 14, an upstanding peripheral wall 16 having an inner surface 16a and an outer surface 16b. At the upper end of peripheral wall 16 is a radially outwardly oriented peripheral flange 16' having a top surface 16c, an outer edge 16d and a bottom surface 16e. This container has an open top, the opening being defined by this peripheral flange 16'. The container should be made of an electrically conductive material that will not corrode or deteriorate when in contact with cell materials. It typically is of stainless steel, iron, nickel, nickel-plated steel or some other conductive material. Stainless steel and nickel are the preferred materials for use with liquid cathode systems such as oxyhalide cells.

Gasket 40 is of a resilient, electrically nonconductive polymeric material chosen to be nonreactive with the cell ingredients. Materials such as nylon, polypropylene, ethylene-tetrafluoroethylene copolymer (Tefzel), polytetrafluoroethylene, fluorinated ethylene-propylene polymer, polychlorotrifluoroethylene, polystyrene and high density polyethylene, etc. have been found suitable for most cells. Tefzel and polytetrafluoroethylene are preferred for oxyhalide cells. The annular peripheral gasket includes a radially extending body 40a engaging upper surface 16c of the container flange. Integral with this body is a depending inner skirt 40b, the outer surface of which lies against the container inner wall surface. Gasket skirt 40b also has an inner surface. At the lower end of this skirt 40b is preferably a radially inwardly extending integral flange portion 40d. Also extending from the gasket body is an outer skirt 40c which, prior to the final crimping operation, extends downwardly over and beyond outer edge 16d of container flange 16' in the manner depicted in FIG. 5, and which in the final assembled crimped form is curled up under the bottom surface 16e of flange 16 and against outer wall surface 16b of container 16.

Figure 2:
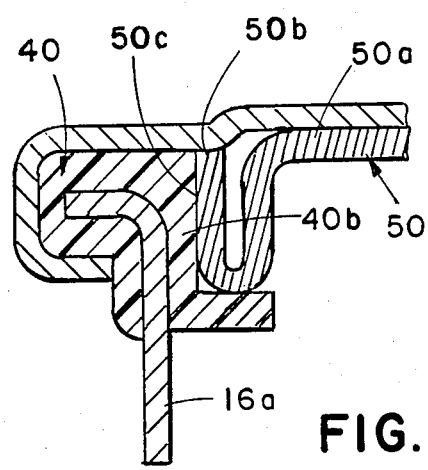
FIG. 2 is an enlarged fragmentary sectional view of a portion of the cell in FIG. 1.
Figure 3:
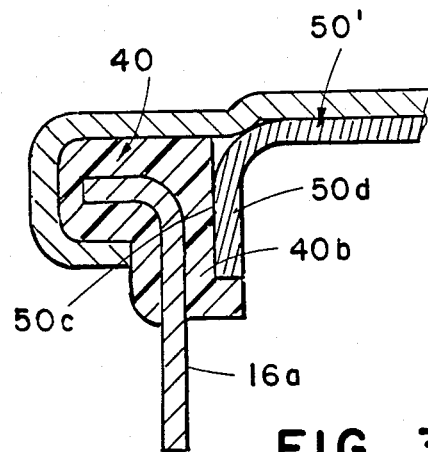
FIG. 3 is an enlarged sectional fragmentary view of a like portion of the cell in FIG. 2, but with a modified inner cover.
Figure 4:
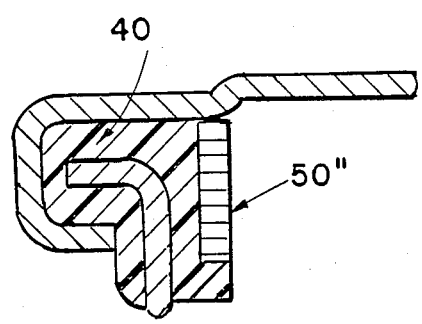
FIG. 4 is an enlarged sectional fragmentary side elevational view of a portion of a cell comparable to FIGS. 2 and 3 but with a further modification of the inner cup or cover.

Radial compressor inner member 50 may conceivably take any of the three forms shown in FIGS. 2, 3 and 4, but preferably is in one of the forms shown in FIG. 2 and FIG. 3, that is in the form of an inner cover having an inverted cup shape, with or without a rolled back edge. Inner member 50 in FIG. 1 corresponds to that depicted in FIG. 2, i.e. an inner cover of an inverted cup-shaped configuration having a top 50a and a downwardly extending edge which is rolled back outwardly and upwardly at 50b to provide outer peripheral surface 50c. This outer surface 50c, in the assembled form of the cell, is basically parallel to container inner surface 16a and spaced from the container wall an amount less than the original thickness of gasket inner skirt 40b. The diameter of outer surface 50c is less than the inner diameter of the container wall inner surface but greater than the original diameter of the inner surface of gasket 40. The gasket, and specifically its inner skirt 40b, is in radially outward compression between surface 50c and surface 16a. This inner cover is made of conductive material such as stainless steel, Monel, copper-clad stainless steel, or the like. Stainless steel is preferred for oxyhalide cells.

Alternate inner member 50' in FIG. 3 does not have the rolled back outer edge, such that the depending outer edge 50d has its outer surface 50c parallel to the container wall and in cooperation with the inner surface of skirt 40b of gasket 40, to radially outwardly compress the gasket against inner surface 16a of container 16. The spacing of surface 50c from surface 16a is less than the original thickness of inner skirt 40b, i.e. outer surface 50c has a diameter greater than the original diameter of the inner surface of the gasket, but less than the inner surface of the container. When assembled, the radially outward compression applied to the gasket retains the gasket against inward movement when the outer cover is applied and crimped, and also seals the cell temporarily to prevent electrolyte from escaping to contact the outer cover.

Each of these two versions of inner member depicted in FIGS. 1, 2 and 3 has an axial spring 56 (FIGS. 5 and 6) or other suitable resilient contact means on the underside of the cover. This spring member preferably comprises a sheet metal member having downwardly curved leaf spring prongs 56a so that the lower ends thereof resiliently press against the anode 30, causing the operative components of the cell to be axially pressed together for most efficient operation. This spring is attached to the inside surface of the inner cup by suitable means such as welding.

The less preferred structure for this inner compression member shown at 50'' in FIG. 4 also provides the radially outward compressive force on the gasket but does not itself aid in the axial compression of the cell components together in the manner of the preferred structures in FIGS. 2 and 3. Optionally, the spring could be attached to the inside of cover 60, for example, to provide axial compressive force.

In all three versions, the lower edge of the inner compressor member rests against the radially inwardly extending lower flange 40d of the gasket.

Outer cover 60 (see FIG. 6 or 8) is a conductive metal member to close the top of the cell. It includes a closure body 60a and a downwardly depending peripheral rim 60b. The inner surface of rim 60b has a diameter slightly greater than the outer diameter of the container at outer edge 16d of flange 16', forming a space which is slightly smaller than the original thickness of gasket outer skirt 40c. Rim 60b extends below flange 16', enabling this outer peripheral rim 60b to be formed as by crimping down and around beneath flange 16' as well as around outer skirt 40c. As shown in FIG. 8, outer gasket skirt 40c extends further down than rim 60b to prevent electrical contact of rim 60b with the container wall 16b when the rim is so formed or crimped. This forming action compresses the body of the gasket against the container flange upper surface 16c, as well as compressing gasket outer skirt 40c against outer edge 16d of the flange, against bottom surface 16e of the flange and against the outer surface 16b of the container peripheral wall. Outer cover 60 is made of an electrically conductive material such as Monel, stainless steel, etc.

Porous cathode collector 20 is of conventional type and has a liquid cathode-electrolyte in association therewith. For cells employing solid rather than liquid cathode materials, a cathode body comprising an active cathode material would be substituted for cathode collector 20.

Separator 22 is of conventional type, lying over the entire surface of the cathode collector and liquid cathode therein so that its outer peripheral edge is adjacent the container inner wall. The separator 22 may also contain liquid cathode-electrolyte. Gasket 40, and particularly the lower flange portion 40d thereof, rests against the outer top peripheral portion of separator 22, around the periphery of the anode. This anode, in a lithium/liquid cathode cell such as a lithium/oxyhalide cell, is of a conventional type such as a lithium layer 30b pressed onto the surface of a conventional conductive collector material 30a such as Exmet(TM) expanded metal.

The novel construction provides improved gasket compression with resultant effective sealing. The gasket is secured in such fashion that during closing operations, e.g. redrawing and crimping, it does not pull away from the container inside wall. The gasket is retained securely between the internal compressor member and the container, and between the outer cover and the container. Placement of the inner compressor member inside the top portion of the gasket serves to maintain constant gasket concentricity and snugness during the redrawing and crimping operations. This minimizes the potential leakage paths. The length of the negative leakage path is increased, equivalent to the height of the inner cup peripheral ring. Further, during assembly a temporary seal achieved by the inner cup permits final closure of the cell with a clean outer cover not contaminated with oxyhalide liquid or vapor or other electrolyte materials which would initiate corrosion and leakage paths. This presents significant advantages over the prior art. In effect it provides an increase in the length of both the negative and positive leakage paths using the same number or fewer parts than in the prior art. A more uniform gasket compression is obtained.

Cells assembled according to the novel construction show an improvement not only in leakage prevention but also in service. Experimental lots were made for service and leakage evaluation. These lots had a lithium anode input of 145 mAh and a liquid $SOCl_2$ cathode-electrolyte (1.5 M $LiAlCl_4$ in $SOCl_2$ with 0.25 grams per liter dissolved vinyl polymer). The cathode input was 160 mAh per cell. The porous cathode collector was made from a mixture of 90 percent carbon black and 10 percent polytetrafluoroethylene binder which was sintered for 16 minutes at 325 degrees C. and then formed into a pellet, 0.427 inch in diameter, 0.089 inch in height and 0.085 g in weight. The cathode cup, i.e. cell container, outer cover, and inner member were made of 304 stainless steel. The spring used was made from 302 half-hard stainless steel. The gasket was made of a copolymer of ethylene and tetrafluoroethylene known as "Tefzel 200". The service and leakage data set forth below were obtained. An 18–21 percent increase in heavy drain (1K ohm continuous discharge at 21 degrees C.) was observed, as well as a significant improvement concerning leakage (after storage at 21 degrees C., 90 percent relative humidity) versus control cells. The control cells were made according to the conventional structure depicted in FIGS. 9 and 10. The results are shown in the following table. Service in milliampere hours (to a 2.0 volt cutoff) is shown as an average of three cells (range given in parentheses) for the heavy drain discharge (1K ohm) and also for 3.4K ohm continuous drain. The number of cells showing evidence of leakage out of the total number of cells stored at 21 degrees C., 90 percent relative humidity was determined visually and under 20X magnification after the indicated number of days:

| | CELL CONSTRUCTION EVALUATION $SOCl_2/Li$ | | | | | | | | | |
|---|---|---|---|---|---|---|---|---|---|---|
| | 21° C. Continuous Discharge - Fresh | | 21° C./90% RH Leakage | | | | | | | |
| | mAh to 2.0 v, n = 3 | | 20X | | | | Visual | | | |
| | 1KΩ Cont. | 3.4KΩ Cont. | 8d | 20d | 30d | 60d | 8d | 20d | 30d | 60d |
| Control | 89 (98–77) | 126 (131–121) | 5/5 | 5/5 | 5/5 | 5/5 | 5/5 | 5/5 | 5/5 | 5/5 |
| Double Anode Cup* | 105 (107–103) | 126 (130–123) | 0/5 | 0/5 | 3/5 | 3/5 | 0/5 | 0/5 | 0/5 | 0/5 |
| Double Anode Cup** | 108 (112–105) | 134 (137–130) | 0/5 | 0/5 | 2/5 | 3/5 | 0/5 | 0/5 | 0/5 | 2/5 |

*Inner Cup Rollback = .040" Diameter = .403 Gasket Diameter = .405
**Inner Cup Rollback = .030" Diameter = .410 Gasket Diameter = .405

In assembly of the cell, container 12, gasket 40, cathode collector 20, liquid cathode-electrolyte, separator 22, anode 30, inner compressor cup 50 with its spring 56, gasket 40 and outer cover 60 are provided. Cathode collector 20 is placed in the container, separator 22 placed thereon, and peripheral gasket 40 placed on the upper periphery of container 12. Liquid cathode-electrolyte is added in the cell, anode 30 is inserted and then inner compressor cup 50 is forcefully inserted to compress inner skirt 40b of gasket 40 radially outwardly against the inside peripheral wall surface of container 12 while spring 56 axially compresses the anode, separator and cathode collector tightly together (FIGS. 5 and 6). Outer cup 60 is then forced down over the assembly, into contact with inner cup 50 (FIG. 7) to cause the outer peripheral downwardly extending flange 60b to press the outer skirt of the gasket into engagement with outer edge 16d of container flange 16' and to extend below the flange. Then the assembly is subjected to redrawing and crimping or other closure operations during which the outer cover member is axially compressed onto the assembly to force gasket body 40a against the top surface 16c of flange 16' and its peripheral flange crimped beneath flange 16' of the container, causing the gasket outer skirt to be compressed against the bottom surface 16e of this flange and radially inwardly against edge 16d and outer surface 16b of the container wall (FIG. 8). During these latter stages of assembly, the inner cup member retains the gasket outwardly in tight sealing engagement with the inner wall of the container, in contrast to the tendency of the prior art arrangement to allow the gasket to move inwardly away from the inner wall.

Figure 9:
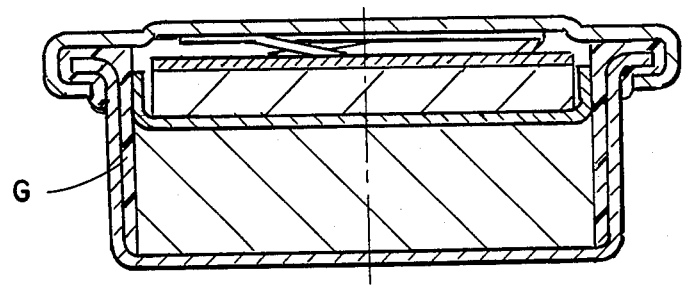
FIG. 9 is a side elevational sectional view of a prior art cell.
Figure 10:
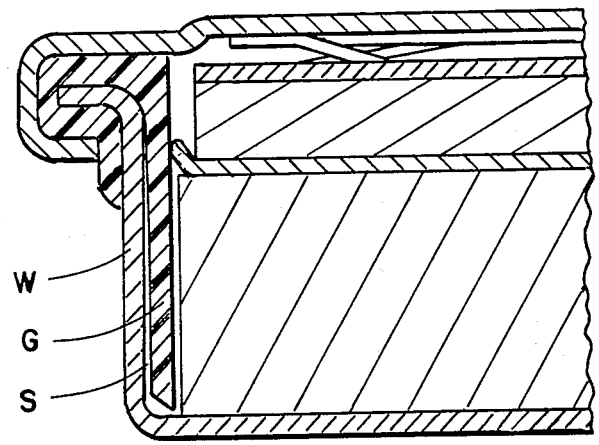
FIG. 10 is an enlarged fragmentary sectional side elevational view of a portion of the cell in FIG. 9, showing the prior art cell after closing operations.

More specifically as to the prior art structure depicted in FIG. 9, it has been found by dissection and analysis of the finished cell that the peripheral gasket G during redrawing and crimping operations tends to move away from the inner surface of container wall W (FIG. 10), leaving a space S which initiates a direct leakage path for the electrolyte. Moreover, during the redrawing operation, there is a tendency for electrolyte to be squeezed into flowing relationship along the inner surface of the cover, accelerating the corrosive action which ultimately enables leakage to occur within a relatively short time.

Various modifications of the invention may conceivably be made by those in the art to suit a particular usage. Also, certain additional advantages and features may be realized in use of the invention. It is intended, therefore, that the invention is not to be limited to the preferred illustrative embodiments depicted, but only by the scope of the appended claims and the reasonable equivalents thereto.

The embodiments of the invention in which an exclusive property or privilege is claimed are defined as follows:

1. An electrochemical cell having anode, cathode and electrolyte components and comprising:
    an open top container having a peripheral top, an inner upstanding peripheral wall surface, and an outer upstanding peripheral wall surface;
    a resilient peripheral gasket over said peripheral top with an inner depending peripheral skirt in engagement with said inner wall portion, an upper body in engagement with said peripheral top, and an outer depending peripheral skirt;
    an inner compressor element within said container and having an outer compressor wall in radially outwardly compressive relationship with said gasket inner skirt to press it against said container inner peripheral wall surface; and
    an outer cover over the top of said container and in compressive relationship with said gasket upper body against said container peripheral top, and in radially inwardly compressive relationship with said gasket outer skirt against said container outer wall surface.

2. The cell in claim 1 wherein said inner compressor element comprises an inner cover.

3. The cell in claim 2 wherein said inner cover includes inner spring means for axially biasing the cell components together.

4. The cell in claim 4 wherein said inner compressor element is an inverted cup.

5. The cell in claim 4 wherein said inverted cup has a rolled back outer peripheral edge.

6. The cell in claim 1 wherein said inner compressor element is a ring.

7. The cell in claim 1 wherein said container peripheral top has a radially outward peripheral flange normal to said container inner and outer wall surfaces.

8. An electrochemical cell having anode, cathode and electrolyte components and comprising:
    an open top container having a peripheral top flange, an inner upstanding peripheral wall surface, and an outer upstanding peripheral wall surface;
    a resilient peripheral gasket over said top flange with an inner depending peripheral skirt in engagement with said inner wall portion, an upper body in engagement with said flange, and an outer depending peripheral skirt;
    an inner compressor element within said container and having an outer compressor wall in radially outwardly compressive relationship with said gasket inner skirt to press it against said container inner peripheral wall surface; and
    an outer cover over the top of said container and in compressive relationship with said gasket upper body against said container flange, and in radially inwardly compressive relationship with said gasket outer skirt against said container outer wall surface.

9. A method of assembling an electrochemical button cell having anode, cathode and electrolyte components, comprising the steps of:
    providing an open top container having an inner upstanding wall surface, an outer upstanding wall surface and peripheral top;
    placing the anode, cathode and electrolyte components into said container;
    providing an annular gasket having a generally U-shaped cross section including an inner depending skirt, an outer depending skirt, and a body between them;
    placing said gasket on said peripheral top with said inner depending skirt of said gasket against the inner wall of said container and said outer skirt depending below said peripheral top;
    forcing an inner compressor element into said container against said inner gasket skirt to press said inner skirt against said container inner wall surface;
    providing an outer cover having a depending rim greater in diameter than said peripheral top and said gasket;
    placing said outer cover onto said inner element, with said rim extending beyond said gasket and said container peripheral flange in a manner to compress said gasket body and outer skirt against said container; and
    forcing said outer cover rim around said peripheral top to compress said outer gasket skirt against said peripheral top and said container outer wall surface.

10. A method of assembling an electrochemical button cell having anode, cathode and electrolyte components, comprising the steps of:
    providing an open top container having an inner upstanding wall surface, an outer upstanding wall surface and an upper outwardly extending peripheral flange;
    placing the anode, cathode and electrolyte components into said container;
    providing an annular gasket having a generally U-shaped cross section including an inner depending skirt, an outer depending skirt, and a body between them;
    placing said gasket on said upper flange with said inner skirt of said gasket against the inner wall of said container and said outer skirt depending below said peripheral top;
    forcing an inner compressor element into said container against said inner gasket skirt to press said inner skirt against said container inner wall surface;
    providing an outer cover having a depending rim greater in diameter than said container flange and said gasket;

placing said outer cover onto said inner element, with said rim extending beyond said gasket and said container peripheral flange in a manner to compress said gasket body and outer skirt against said flange; and
forcing said outer cover rim around and beneath said peripheral edge to compress said outer gasket skirt against the underside of said container flange and against said container outer wall surface.

* * * * *